US012431054B2

United States Patent
Wang et al.

(10) Patent No.: US 12,431,054 B2
(45) Date of Patent: Sep. 30, 2025

(54) IMAGE PROCESSING METHOD AND APPARATUS OF DISPLAY SCREEN, SYSTEM AND DEVICE

(71) Applicant: XI'AN NOVASTAR TECH CO., LTD., Xi'an (CN)

(72) Inventors: Shuo Wang, Xi'an (CN); Minjie Duan, Xi'an (CN); Guifeng Wei, Xi'an (CN)

(73) Assignee: XI'AN NOVASTAR TECH CO., LTD., Xi'an (CN)

( * ) Notice: Subject to any disclaimer, the term of this patent is extended or adjusted under 35 U.S.C. 154(b) by 0 days.

(21) Appl. No.: 18/728,725

(22) PCT Filed: Apr. 24, 2022

(86) PCT No.: PCT/CN2022/088821
§ 371 (c)(1),
(2) Date: Jul. 12, 2024

(87) PCT Pub. No.: WO2023/205960
PCT Pub. Date: Nov. 2, 2023

(65) Prior Publication Data
US 2025/0104590 A1    Mar. 27, 2025

(51) Int. Cl.
G09G 3/20         (2006.01)
G06T 7/73         (2017.01)
G09G 3/32         (2016.01)

(52) U.S. Cl.
CPC .......... G09G 3/2003 (2013.01); G06T 7/73 (2017.01); G09G 3/32 (2013.01);
(Continued)

(58) Field of Classification Search
None
See application file for complete search history.

(56) References Cited

U.S. PATENT DOCUMENTS

2008/0068293 A1    3/2008  Ishii
2015/0269895 A1    9/2015  Kao et al.
(Continued)

FOREIGN PATENT DOCUMENTS

CN    103020950 A  *  4/2013  .......... G06T 7/0004
CN    103888742 A     6/2014
(Continued)

OTHER PUBLICATIONS

Extended EP Search Report to corresponding EP Appln. No.: 22938819.4 mailed May 8, 2025 (10 pages).

Primary Examiner — Kenneth Bukowski
(74) Attorney, Agent, or Firm — Nicholas Martin; Greenberg Traurig, LLP

(57) ABSTRACT

The present invention discloses an image processing method and an image processing system of a display screen. Where, the method is applied to any control device in a plurality of control devices, the plurality of control devices are configured for loading the display screen, and the method includes: obtaining compensation data of the display screen corresponding to position information of an image acquisition device in a spatial model, where the image acquisition device is configured to photograph an image displayed on the display screen, the spatial model is used to represent a three-dimensional coordinate system where the display screen is located; and compensating the image displayed on the display screen based on the compensation data. The present invention solves a technical problem that compensation on the image of the display screen is greatly limited.

15 Claims, 8 Drawing Sheets

(52) U.S. Cl.
CPC ............. *G06T 2207/10028* (2013.01); *G09G 2320/0646* (2013.01); *G09G 2320/0693* (2013.01)

(56) References Cited

U.S. PATENT DOCUMENTS

| | | | |
|---|---|---|---|
| 2017/0316612 A1* | 11/2017 | Moteki | G06T 15/20 |
| 2019/0147616 A1* | 5/2019 | Yu | G06T 7/337 |
| | | | 382/103 |
| 2021/0217157 A1* | 7/2021 | Han | G09F 9/33 |
| 2023/0260480 A1* | 8/2023 | Hochman | G06V 10/56 |
| | | | 345/589 |

FOREIGN PATENT DOCUMENTS

| | | |
|---|---|---|
| CN | 105590604 A | 5/2016 |
| CN | 110767150 A | 2/2020 |
| CN | 112309317 A | 2/2021 |
| CN | 112419997 A | 2/2021 |
| CN | 112885289 A | 6/2021 |
| CN | 113257167 A | 8/2021 |
| JP | 2015102681 A | 6/2015 |

* cited by examiner

IMAGE PROCESSING METHOD AND APPARATUS OF DISPLAY SCREEN, SYSTEM AND DEVICE

CROSS-REFERENCE TO RELATED APPLICATION

This application is a 35 U.S.C. § 371 national stage application of PCT patent application No. PCT/CN2022/088821, the entire contents of which is incorporated herein by reference.

TECHNICAL FIELD

The present invention pertains to the field of image processing technologies, and more particularly, to an image processing method and an image processing system of a display screen.

BACKGROUND

At present, when a display screen is photographed by using an image acquisition device, due to physical factors such as encapsulation and mask of a luminescent device of the display screen, a color cast problem occurs when the display screen is observed at different observation points.

In the related art, a single camera stand is usually used to generate a compensation coefficient value at the nearest observation point, and an output image of a receiving card is compensated by a compensation coefficient value to avoid the color cast problem. However, the method may only ensure that the displaying of the display screen after compensation by the compensation coefficient value under one observation point is normal. When the observation point changes, the color cast problem may occur again.

Therefore, if the image acquisition device needs to photograph an image without color cast, the image acquisition device can only be fixed at this specific observation point to photograph the image of the display screen. Thus, a technical problem of great limitation on the compensation of the images of the display screen is caused.

Regarding the aforesaid problem that the compensation of the image of the display screen is greatly limited, an effective solution for solving the aforesaid problem has not been proposed yet.

SUMMARY

Embodiments of the present invention provide an image processing method and an image processing system of a display screen, which aim to at least solving the technical problem that the compensation on the images of the display screen are greatly limited.

According to one aspect of the embodiments of the present invention, an image processing method of a display screen is provided, this method is applied to any control device in a plurality of control devices, the plurality of control devices are configured for loading the display screen, the method includes: obtaining compensation data of the display screen corresponding to position information of at least one image acquisition device in a spatial model, where the image acquisition device is configured to photograph an image displayed on the display screen, the spatial model is used to represent a three-dimensional coordinate system where the display screen is located, and the control device and the image acquisition device are controlled to be synchronized by a synchronizing signal; and compensating the image displayed on the display screen based on the compensation data.

Optionally, said obtaining the compensation data of the display screen corresponding to the position information of the image acquisition device in the spatial model includes: receiving the compensation data sent from a coordination processing module, wherein the coordination processing module is connected to at least one control device of the plurality of control devices, the compensation data is generated by the coordination processing module based on the obtained position information, and the position information is determined by the coordination processing module based on the obtained spatial model and the position information of the image acquisition device.

Optionally, the coordination processing module communicates with the image acquisition device based on wireless transmission.

Optionally, the position information is obtained by the coordination processing module or by the control device according to a target frequency; and/or the compensation data is obtained by the coordination processing module or by the control device, if an amount of variation in the position information meets a target threshold value.

Optionally, the compensation data is sent back to a server by the coordination processing module, wherein said compensating the image displayed on the display screen based on the compensation data includes obtaining, from the server, a compensation result obtained by compensating the image displayed on the display screen based on the compensation data.

Optionally, a plurality of image acquisition devices are provided, said obtaining the compensation data of the display screen corresponding to the position information of the at least one image acquisition device in the spatial model includes: outputting multiple groups of frame images alternately and obtaining the compensation data corresponding to the multiple groups of output frame images, where the compensation data is generated based on the position information of the corresponding image acquisition device in the spatial model.

Optionally, a plurality of image acquisition devices are provided, said obtaining the compensation data of the display screen corresponding to the position information of the image acquisition device in the spatial model includes: obtaining multiple groups of frame images based on a target instruction, where each of the multiple groups of the frame images corresponds to one control device, and the target instruction is used for adjusting a frequency used by each image acquisition device when photographing the image displayed on the display screen; obtaining the compensation data corresponding to the multiple groups of output frame images when alternately outputting the multiple groups of frame images, where the compensation data is generated based on the position information of the corresponding image acquisition device in the spatial model.

Optionally, said compensating the image displayed on the display screen based on the compensation data includes: compensating the multiple groups of output frame images based on the compensation data, respectively; said obtaining the compensation data of the display screen corresponding to the position information of the image acquisition device in the spatial model includes: determining, based on the position information and coordinate information of a luminescent device of the display screen, multiple different angle information between the plurality of image acquisition devices corresponding to the position information and the luminescent device of the display screen; determining optical information decay data of the image displayed on the display screen based on the multiple different angle information; and determining the compensation data based on the optical information decay data. Where the compensation data is assigned by any control device to another control device excluding the control device in the plurality of control devices.

Optionally, the method further includes: obtaining a plurality of position information samples of the image acquisition device in the spatial model, where the plurality of position information samples include the position information; determining, based on the plurality of position information samples and the coordinate information of the luminescent device of the display screen, a plurality of angle information samples between the plurality of image acquisition devices corresponding to the plurality of position information samples and the luminescent device of the display screen, to obtain the plurality of angle information samples; determining at least one first angle information sample from the plurality of angle information samples, where the at least one first angle information sample includes the angle information and is configured to cause the image displayed on the display screen to generate an optical information decay data sample; determining a corresponding compensation data sample based on the optical information decay data sample corresponding to each first angle information sample to obtain at least one compensation data sample, where the at least one compensation data sample includes the compensation data; where said determining the compensation data based on the optical information decay data includes: querying the compensation data corresponding to the optical information decay data in the at least one compensation data sample.

Optionally, the method further includes: determining, if it is determined that a first image in the image displayed on the display screen generates optical information decay data based on the position information, that the first image needs to be compensated; or determining, if it is determined that a second image in the image displayed on the display screen does not generate the optical information decay data based on the position information, that the second image does not need to be compensated.

Optionally, said obtaining the compensation data of the display screen corresponding to the position information includes: determining the first image based on coordinate information of the image acquisition device in the spatial model, and angle information between the image acquisition device and a luminescent device of the display screen, where the position information includes the coordinate information and the angle information; retrieving the compensation data corresponding to the first image from a first database, where the first database includes the coordinate information, the angle information, the compensation data, and a correspondence relationship between the coordinate information, the angle information and the compensation data.

Optionally, the first database includes a plurality of compensation data samples, and the plurality of compensation data samples correspond to a plurality of position information samples of the image acquisition device in the spatial model in a one-to-one correspondence manner, the plurality of compensation data samples are obtained based on optical information decay data samples generated in the image photographed by the corresponding image acquisition device, the plurality of position information samples include the position information, and the plurality of compensation data samples include the compensation data.

Optionally, the first image of the display screen that needs to be compensated is obtained by a coordination processing module from a receiving device of the display screen, a target control device configured for controlling displaying of the first image in the plurality of control devices is determined by the coordination processing module, and the target control device is controlled by the coordination processing module to compensate a luminescent device corresponding to the first image based on the compensation data.

Optionally, the method further includes: obtaining a first image and a second image sent by a coordination processing module, where the first image is an image that needs to be compensated in the image displayed on the display screen, the second image is an image that does not need to be compensated in the image displayed on the display screen, the first image and the second image are determined by the coordination processing module based on a second database, the second database includes an image of the display screen that needs to be compensated and is determined by the position information and/or an image of the display screen that does not need to be compensated and is determined by the position information.

Optionally, the position information includes coordinate information of the image acquisition device in the spatial model and angle information of the image acquisition device and a plurality of luminescent devices of the display screen in the spatial model, obtaining the angle information of the image acquisition device relative to each of the luminescent devices in the spatial model includes: obtaining first coordinate information of the image acquisition device in the spatial model, and obtaining second coordinate information of each of the plurality of luminescent devices in the spatial model; and determining the angle information of the image acquisition device relative to each of the plurality of luminescent devices at least based on the first coordinate information and the second coordinate information; where the angle information includes an elevation angle of the image acquisition device relative to each of the plurality of luminescent devices and an azimuth angle of the image acquisition device relative to each of the plurality of luminescent devices.

Optionally, the spatial model is established by taking a target position in a space where the display screen is located as a coordinate origin, and the target position includes a point on an edge of the display screen.

According to another aspect of the embodiments of the present invention, an image processing method of a display screen is further provided, this method may include: constructing a spatial model of the display screen in response to a spatial model construction operation instruction exerting on a graphical user interface, where the spatial model is used to represent a three-dimensional coordinate system where the display screen is located; obtaining position information of at least one image acquisition device in the spatial model, where the image acquisition device is configured to photograph an image displayed on the display screen; generating, in response to a compensation operation instruction from the graphical user interface, compensation data of the display screen based on the position information, and assigning the compensation data to a plurality of control devices. Where, the plurality of control devices are configured for loading the display screen.

According to another aspect of the embodiments of the present invention, an image processing apparatus of a display screen is further provided, the apparatus is applied to any control device in a plurality of control devices. The apparatus may include: an acquisition module configured to obtain compensation data of the display screen corresponding to position information of an image acquisition device in a spatial model, the image acquisition device is configured to photograph an image displayed on the display screen, the spatial model is used to represent a three-dimensional coordinate system where the display screen is located, the control device and the image acquisition device are controlled to be synchronized by a synchronizing signal; a compensation module configured to compensate the image displayed on the display screen based on the compensation data.

According to another aspect of the embodiments of the present invention, an image processing system of a display screen is further provided, this system may include: at least one image acquisition device, a coordination processing module, and a plurality of control devices. Where, the image acquisition device is configured to photograph an image displayed on the display screen, wherein the control devices and the image acquisition device are controlled to be synchronized by a synchronizing signal. The coordination processing module is configured to: obtain a spatial model of the display screen, where the spatial model is used to represent a three-dimensional coordinate system where the display screen is located; obtain position information of the image acquisition device in the spatial model, where the image acquisition device is further configured to generate compensation data of the display screen based on the position information, and synchronize the compensation data to the plurality of control devices. The plurality of control devices are configured to compensate the image based on the compensation data, where the plurality of control devices are configured for loading the display screen.

According to another aspect of the embodiments of the present invention, an image processing device of a display screen is further provided, the device may include: an acquisition unit, an arithmetic unit and an assignment unit. Where, the acquisition unit is configured to obtain position information of an image acquisition device in a spatial model of the display screen, where the spatial model is used to represent a three-dimensional coordinate system where the display screen is located. The arithmetic unit is configured to generate compensation data of the display screen based on the position information of the image acquisition device in the spatial model of the display screen. The assignment unit is configured to assign the compensation data to a plurality of control devices, where the plurality of control devices are configured for loading the display screen.

Optionally, an image processing device obtains the position information of the image acquisition device by utilizing a bidirectional communication interface.

Optionally, a determination unit is configured to determine a receiving device and a driving module of a luminescent device corresponding to an image of the display screen to be compensated. The assignment unit includes an assignment module configured to assign the compensation data to the control device corresponding to the receiving device and the driving module.

According to another aspect of the embodiments of the present invention, a non-transitory computer readable storage medium is further provided. The computer readable storage medium stores a computer program, that, when executed by an image processing device of a display screen, causes the image processing device to perform the image processing method of the display screen.

In this embodiment of the present invention, for any control device in the plurality of control devices, the compensation data of the display screen corresponding to the position information of the image acquisition device in the spatial model may be obtained first. Then, the image displayed on the display screen is compensated based on the compensation data. Where, the image acquisition device is configured to photograph the image displayed on the display screen, the image acquisition device and the control device may be controlled to be synchronized by using a synchronizing signal, the spatial model is used to represent the three-dimensional coordinate system where the display screen is located. That is, aiming at any position information of the image acquisition device in the three-dimensional coordinate system where the display screen is located, the plurality of control devices of the present invention may use the corresponding compensation data to compensate the image displayed on the display screen, a condition that the image acquisition device can only be fixed to a specific observation point to photograph the display screen is avoided, an objective of flexibly compensating the images of the display screen is achieved. Thus, the technical problem that the compensation on the image of the display screen is greatly limited is solved, and a technical effect of reducing the limitation on the compensation of the images of the display screen is realized.

DESCRIPTION OF THE DRAWINGS

The accompanying figures described herein are used to provide further interpretation of the present invention, and are constituted as a part of the present invention. The exemplary embodiments and the description of the exemplary embodiments are intended to explain the present invention rather than being constituted as improper limitation to the present invention. In the accompanying figures.

DETAILED DESCRIPTION OF EMBODIMENTS

In order to make the ordinarily skilled one in the art to understand the technical solutions of the present invention better, the technical solutions in the embodiments of the present invention will be described in detail below with reference to the accompanying drawings in the embodiments of the present invention. It is apparent that, the embodiments described below are merely some embodiments of the present invention, rather than all of the embodiments. Based on the embodiments in the present invention, other embodiments, which are obtained by the person of ordinary skill in the art at without paying creative effort, should all be included in the protection scope of the present invention.

It should be noted that the terms "first", "second", and the like in the specification, the claims, and the drawings of the present invention are used to distinguish similar objects, and are not necessarily used to describe a specific order or sequence. It should be understood that the data used in this manner may be interchanged in appropriate circumstances, so that the embodiments described herein may be implemented in an order other than those illustrated or described herein. In addition, the terms "including" and "having", and any variations thereof, are intended to cover nonexclusive inclusion. For example, processes, methods, systems, products, or devices which include a series of steps or units need not be limited to those clearly listed steps or units. Instead, the processes, the methods, the systems, the products or the devices may include other steps or units that are not clearly listed or inherent to these processes, methods, products, or devices.

The minimum display unit of the display screen is a luminescent device. For example, the display screen is a light-emitting diode (LED) display screen, and the luminescent device is an LED lamp point (which may also be referred to as an LED lamp bead). A single luminescent device generally includes three independent luminescent devices (also referred to as light-emitting units) of three primary colors (RGB), these luminescent devices have a certain spatial arrangement relationship, that is, a vertical in-line arrangement, a horizontal in-line arrangement, a triangular arrangement, and the like. Due to physical factors such as packaging and mask of the luminescent device, when the luminescent device is observed at different angles and directions, a problem of color deviation (i.e., a color cast problem) occurs, which may be embodied in that the luminescent device is transversely arranged from left to right and is observed from the left side of the display screen, the light-emitting intensity relationship of the display screen is R>G>B, and a bluish phenomenon is caused.

Figure 1A:
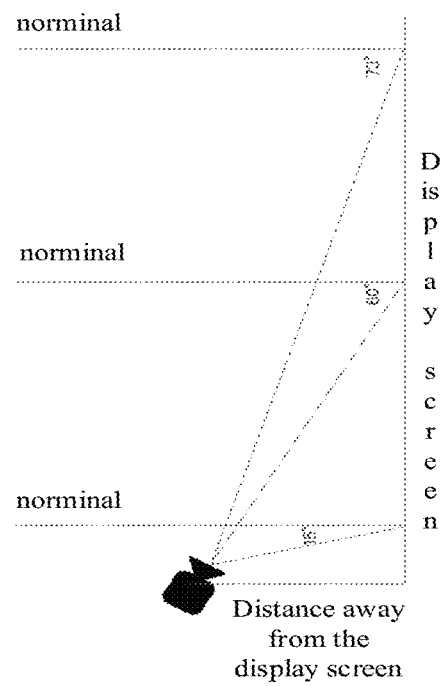
FIG. 1A is a schematic diagram of a cause of formation of non-uniform, color cast of a display screen according to the related art.

FIG. 1A is a schematic diagram of a cause of formation of non-uniform color cast of a display screen according to the related art. As shown in FIG. 1A, a position of the image acquisition device when the display screen is photographed is an observation point, when the image acquisition device photographs images and an included angle between the image acquisition device and the normal line of the display screen is 15°, 60° and 73° respectively, according to a principle that the farther the distance away from the observation point, the more obvious the color cast problem is, when the image acquisition device photographs an image and the included angle between the image acquisition device and the normal line of the display screen is 73°, the color cast problem corresponding to this angle is most obvious. The observation point is a position of a human eye when the display screen is observed or the position of the image acquisition device when the image acquisition device photographs the display screen.

In the related art, a solution of compensation with one single camera stand is usually used, such that the display screen has no obvious color cast problem when being observed under the camera stand. For example, the compensation data required for using the point-by-point brightness correction is stored in a ROM of a receiving card, which has the characteristics of large data volume and high precision. For example, a single camera stand is used to perform compensation correction at the nearest observation point to generate point-by-point brightness chrominance compensation data which is stored in the receiving card. A FPGA of the receiving card obtains the compensation data from the ROM, performs matrix operation, and apply the compensation data to an output image of the receiving card.

However, the using of point-by-point brightness chrominance compensation may only solve the problem of color cast under a specific observation point. When a position of an image acquisition device changes, the color cast problem may occur again, and the effect cannot be ensured perfectly. Therefore, if it is desired to photograph an image without color cast using the image acquisition device, the image acquisition device can only be fixed at this specific position in order for capturing images.

Figure 1B:
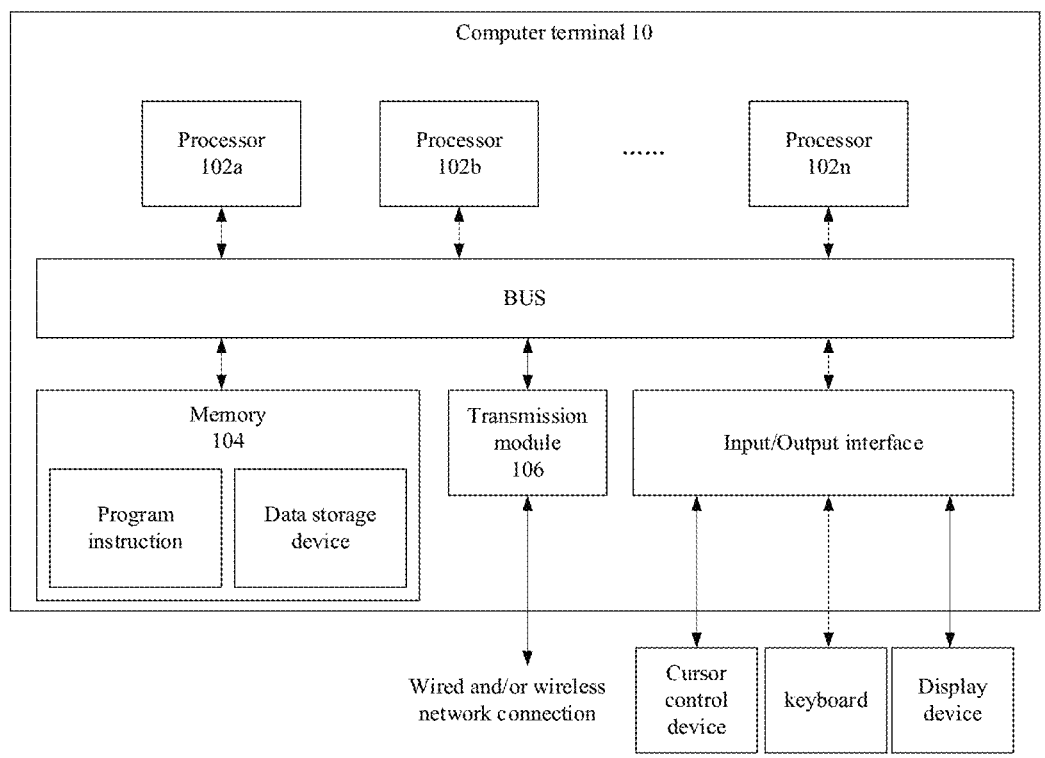
FIG. 1B is a block diagram of a hardware structure of a computer terminal (or an electronic device) for implementing an image processing method of the display screen according to an embodiment of the present invention.

In this background, an image processing method of a display screen is provided in an embodiment of the present invention. The image processing method of the display screen provided in this embodiment of the present invention may be performed in a mobile terminal, a computer terminal, or a similar computing device. FIG. 1B illustrates a block diagram of a hardware structure of a computer terminal (or an electronic device) for implementing the image processing method of the display screen. As shown in FIG. 1B, the computer terminal 10 (or the electronic device 10) may include one or more (represented by 102 $a$, 102 $b$, . . . , 102$n$) processors 102 (the processor 102 may include, but is not limited to, a processing device such as a microprocessor MCU or a programmable logic device FPGA), a memory 104 for storing data, and a transmission module 106 for communication purpose. In addition, the computer terminal 10 may further include: a display, an input/output interface (I/O interface), a universal serial bus (USB) port (which may be included as one of ports of the I/O interface), a network interface, a power supply and/or a camera. A person of ordinary skill in the art may understand that the structure shown in FIG. 1B is merely illustrative and does not limit the structure of the electronic device. For example, the computer terminal 10 may further include more or fewer components than those shown in FIG. 1B, or have a configuration being different from that shown in FIG. 1B.

It should be noted that the one or more processors 102 and/or other data processing circuits described above may generally be referred to as "data processing circuit" herein. The data processing circuit may be implemented in whole or in part as software, hardware, firmware, or any other combination. In addition, the data processing circuit may be one single independent processing module; alternatively, all or a part of the data processing circuit may be incorporated into any one of the other elements in the computer terminal 10 (or the electronic device). As involved in the embodiments of the present invention, the data processing circuit is used as a processor for control (for example, a selection of a path of a variable resistance terminal connected to an interface).

The memory 104 may be configured to store a software program and a module of application software, such as a program instruction/data storage device corresponding to the image processing method of the display screen in the embodiments of the present invention, and the processor 102 performs various functional applications and data processing by executing the software program and the module stored in the memory 104, thereby implementing the image processing method of the display screen. The memory 104 may include a high-speed random access memory, and may further include a non-volatile memory, such as one or more magnetic storage devices, flash memories, or other non-volatile solid-state memories. In some instances, the memory 104 may further include memories remotely arranged relative to the processor 102, these remote memories may connect to the computer terminal 10 through a network. The examples of the aforesaid network include, but are not limited to, the Internet, an intranet, a local area network, a mobile communication network, and a combination thereof.

The transmission module 106 is configured to receive or send data through a network. The network may, for example, include a wireless network provided by a communication provider of the computer terminal 10. In one instance, the transmission equipment 106 includes a network interface controller (Network Interface Controller, NIC), the NIC may be connected to other network devices through a base station so as to be communicated with the Internet. In one instance, the transmission equipment 106 may be a radio frequency (RF) module configured to communicate with the Internet in a wireless manner.

The display may, for example, be a liquid crystal display (LCD) having a type of touch screen, said LCD may enable a user to interact with a user interface of the computer terminal 10 (or the electronic device).

Herein, it should be noted that, in some optional embodiments, the computer device (or the electronic device) shown in FIG. 1B may include a hardware element (including a circuit), a software element (including a computer code stored in a computer-readable medium), or a combination of the hardware element and the software element. It should be noted that FIG. 1B is merely an example of a particular embodiment and is intended to illustrate the types of the components that may be present in the aforesaid computer device (or the electronic device).

Figure 2:
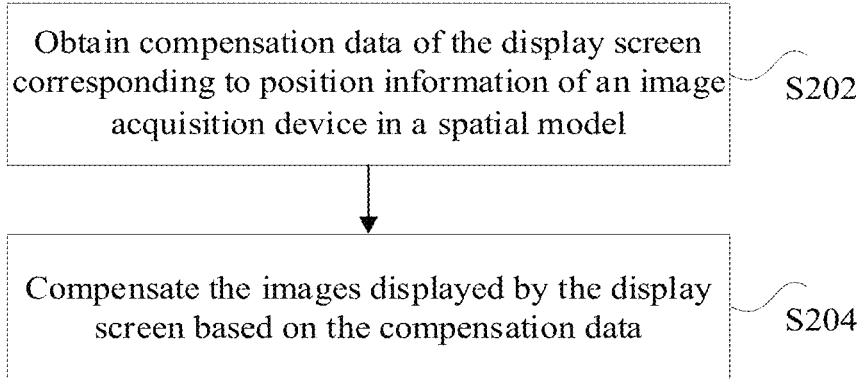
FIG. 2 is a flowchart illustrating an image processing method of a display screen according to an embodiment of the present invention.

Under the operating environment, the embodiments of the present invention provides the image processing method of the display screen shown in FIG. 2, this method is applied to any control device in a plurality of control devices, and the plurality of control devices are configured for loading the display screen. It should be noted that the steps shown in the flowcharts of the accompanying drawings may be performed in, such as, a computer system of a set of computer-executable instructions. Moreover, although a logical order is shown in the flowcharts, in some conditions, the steps shown or described may be performed in an order different from the order herein.

FIG. 2 is a flowchart of the image processing method of the display screen according to an embodiment of the present invention. As shown in FIG. 2, the method may include the following steps:

In a step of S202, compensation data of the display screen corresponding to position information of at least one image acquisition device in a spatial model is obtained. Where the image acquisition device is configured to photograph an image displayed on the display screen, the spatial model is used to represent a three-dimensional coordinate system where the display screen is located, the control device and the image acquisition device are controlled to be synchronized by a synchronizing signal, and the synchronizing signal is generated by an external synchronizing signal generator.

In the technical solution provided in the step S202 of the present invention, with regard to any control device in the plurality of control devices, the compensation data of the display screen corresponding to the position information of the image acquisition device in the spatial model may be obtained. The number of the image acquisition device may be one or plural, and the image acquisition device may be in a moving state.

In this embodiment, the control device may be a controller, and the image acquisition device may be a device such as a camera or a video camera, the type of the image acquisition device is not specifically limited herein. When the image acquisition device photographs the image displayed on the display screen, the images photographed by the image acquisition device at different angles have a color cast problem. For example, a color decay exists. If the image displayed on the display screen are not compensated, color cast occurs. Therefore, in this embodiment, with regard to any control device in the plurality of control devices, the compensation data of the display screen corresponding to the position information of the image acquisition device in the spatial model is obtained, the compensation data may be generated by the control device itself. Alternatively, the compensation data may be obtained from a coordination processing module. The coordination processing module may be a dedicated device in a scene photographing scenario in which the LED display screen is controlled by the plurality of control devices. As an alternative, the coordination processing module may be a host computer software, a server, or be implemented by a transmission device and an all-in-one device in a compatibility mode.

Optionally, in this embodiment, the position information of the image acquisition device in the spatial model may include coordinate information of the image acquisition device in the spatial model. For example, the coordinate information is self-positioning information of the image acquisition device, the positioning information is obtained through a camera specific positioning system or by capturing an image having a location identifier, etc. The spatial model is used to represent a three-dimensional coordinate system where the display screen is located, that is, the spatial model may be used to represent a three-dimensional space where the display screen is located, that is, may be used to represent a three-dimensional space where the display screen is located, the spatial model may be referred to as a screen space color space model and may be pre-established by taking a point on the display screen as an origin, or be a coordinate formed by taking the display screen as a Y-axis or an X-axis or a Z-axis. Optionally, the compensation data in this embodiment may be a compensation coefficient value required for normal display of the luminescent device of the display screen and may be referred to as a compensation value. The compensation data may be obtained through angle information which is determined by the position information of the image acquisition device and the coordinate information of the luminescent device in the display screen, and thus is used for compensating the image displayed on the display screen. The angle information may be an included angle between a connecting line between a position represented by the position information of the image acquisition device and a position represented by the coordinate information of the luminescent device in the display screen, and a normal of the display screen. Optionally, the compensation data in this embodiment may be different compensation data obtained by the image acquisition device by capturing the luminescent devices of the display screen at different angles at the corresponding positions. The luminescent devices of the display screen may be interpreted as pixels of the display screen.

It should be noted that the compensation data in this embodiment may be generated by software, the spatial model may be imported into a main body for calculation of the compensation data, and the spatial model may be a plane or be a curved surface.

In this embodiment, the control device and the image acquisition device may be synchronized by a synchronizing signal, the synchronizing signal may be generated by a synchronization device, and the synchronization device may be a synchronizing signal generator which may be, such as a Genlock generation device, a Time code, and the like. Optionally, the synchronization device may be implemented as a device, and may also be a server in a photographing scenario, as an alternative, the synchronization device may be one control device.

In a step of S204, the image displayed on the display screen are compensated based on the compensation data.

In the technical solution provided in step S202 of the present invention, after obtaining the compensation data of the display screen corresponding to the position information of the image acquisition device in the spatial model, the image displayed on the display screen may be compensated based on the compensation data.

In this embodiment, it is possible that the control device compensates the image displayed on the display screen based on the acquired compensation data when transmitting the image displayed on the display screen, for example, the image data of the image displayed on the display screen is compensated, the image data may be the parameters of the image displayed on the display screen compensated image data may be displayed on the display screen, such that the compensated image data is obtained. Furthermore, the display screen is controlled to display the compensated image data, thereby achieving the objective of compensating the image displayed on the display screen, and avoiding a problem that the images photographed at different angles have color cast when the image displayed on the display screen are photographed by the image acquisition device, such that the image displayed on the display screen can be normally displayed.

It should be noted that, in this embodiment, an order of enabling the control device and the image acquisition device to be synchronized through the synchronizing signal, and compensating the image displayed on the display screen based on the compensation data is not limited.

According to the aforesaid steps S202-S204 of the present invention, regarding any control device in the plurality of control devices, the compensation data of the display screen corresponding to the position information of the image acquisition device in the spatial model may be obtained first, then, the image displayed on the display screen are compensated based on the compensation data. Where the image acquisition device is configured to photograph the image displayed on the display screen, and the image acquisition device and the control device may be controlled to be synchronized by the synchronizing signal, the spatial model is used to represent a three-dimensional coordinate system where the display screen is located, the three-dimensional coordinate system is used for facilitating positioning the location data of the image acquisition device. That is, regarding any position information of the image acquisition device in the three-dimensional coordinate system where the display screen is located, the plurality of control devices of the present invention can compensate the image displayed on the display screen by using the corresponding compensation data, a situation that the image acquisition device can only be fixed to the specific observation point to photograph the images of the display screen is avoided, an objective of flexibly compensating the images of the display screen is achieved, the technical problem of great limitation on the compensation of the images of the display screen is solved accordingly, and the technical effect of reduction of the limitation on the compensation of the images of the display screen is realized.

The aforesaid method in this embodiment is further described in detail below.

As an optional implementation manner, in the step S202 in the image processing method of the display screen, said obtaining the compensation data of the display screen corresponding to the position information of the image acquisition device in the spatial model may include the following steps: receiving compensation data sent from the coordination processing module, where the coordination processing module is connected with at least one control device in the plurality of control devices, the compensation data is generated by the coordination processing module based on the obtained position information, the position information is determined by the coordination processing module based on the obtained spatial model and the position information of the image acquisition device, the position information may be obtained through a spatial positioning system or a spatial orientation device.

In this embodiment, the acquisition of the compensation data required by the display screen may be implemented in the control device. In another optional embodiment, the step of obtaining the compensation data required by the display screen may also be completed by the coordination processing module. The coordination processing model may be a server or be an independent device. Optionally, in this embodiment, the coordination processing module obtains the compensation data of the display screen corresponding to the position information of the image acquisition device in the spatial model and assigns the compensation data to the control device connected to the coordination processing module, and the control device compensates the image displayed on the display screen according to the compensation data.

In this embodiment, when the compensation data is determined by the coordination processing module, the coordination processing module and the image acquisition device may be communicated with each other based on wireless transmission.

In this embodiment, the position information is obtained by the coordination processing module or by the control device according to a target frequency; and/or, if an amount of variation in the position information meets a target threshold value, the compensation data is obtained by the coordination processing module or by the control device.

The target frequency in this embodiment of the present invention is a frequency at which the coordination processing module or the control device obtains the position information of the image acquisition device in the spatial model. The frequency may be a time set by the user himself/herself, for example, the user may set the target frequency as a frequency being synchronized with a display frame frequency. For example, if the frame frequency is 60 Hz, the target frequency may be set to be less than 16.66 milliseconds.

In some scenarios, the image displayed on the display screen does not need to be compensated in real time, the coordination processing module or the control device may be required to obtain the compensation data corresponding to the position information or the corresponding angle information by determining a relationship between an amount of variation in the position information and the target threshold value, for example, when the amount of variation in the position information is greater than 30 cm, or when a viewing angle exceeds a certain preset angle.

In this embodiment, the compensation data is sent back to a server by the coordination processing module. Where, said compensating the image displayed on the display screen based on the compensation data includes obtaining a compensation result obtained by the server by compensating the image displayed on the display screen based on the compensation data.

In this embodiment of the present invention, the coordination processing module returns the compensation data to the server of the previous stage of the coordination processing module, fuses the compensation data and the original image data (the fusion process is implemented in the FPGA) in the server and performs calculation, and then sends calculation result to a transmitting card (or a transmission device), thereby reducing a calculation amount of the transmission device.

In this embodiment, the number of the image acquisition devices is multiple, said obtaining the compensation data of the display screen corresponding to the position information of the image acquisition device in the spatial model specifically includes the following steps: alternately outputting multiple groups of frame images, and obtaining the compensation data corresponding to the multiple groups of output frame images. Where the compensation data is generated based on the position information of the corresponding image acquisition device in the spatial model.

In the aforesaid steps, the multiple groups of frame images may be obtained based on an operation instruction input by the user, the multiple groups of frame images are input by the user through the operation instruction, and the compensation data corresponding to the multiple groups of frame images input by the user are obtained.

In an optional implementation method, in the step S202 of the image processing method of the display screen, said obtaining the compensation data of the display screen corresponding to the position information of the image acquisition device in the spatial model may further include the following steps: obtaining multiple groups of frame images based on the target instruction, where each group of frame images corresponds to one control device, and the target instruction is used for adjusting a frequency used by each image acquisition device when the image displayed on the display screen are photographed; and obtaining the compensation data corresponding to the multiple groups of the output frame images when the multiple groups of frame images are alternately output. Where, the compensation data is generated based on the position information of the corresponding image acquisition device in the spatial model.

In this embodiment, the target instruction may be a frequency doubling function enabling instruction for frequency multiplication of the image displayed on the display screen. This process may be applied to a scenario in which a plurality of image capturing devices are provided, the target instruction may be an instruction for activating a frequency doubling function or a frame interpolation function, and the target instruction is set by a person manually, and is configured to control the plurality of image capturing devices to photograph the multiple groups of frame images displayed on the display screen sequentially and cyclically. The target instruction may be described by using the following examples.

Taking two control devices A and B and cameras M and N as an example. Each control device and each camera are connected to the same signal synchronizing system through the synchronizing signal sent by the synchronizing signal generator. The synchronizing signal is at least used for synchronizing the coordinate information of the cameras M and N in the spatial model, the user sets the target instruction to activate the frequency doubling function or the frame interpolation function of the control devices A and B, the camera M is enabled to photograph a Fm-th frame of the frequency doubling frame of the LED display screen and the camera N is enabled to photograph a Fn-th frame of the frequency doubling frame of the LED display screen by adjusting synchronous phase offset parameters of the cameras. Where, the adjustment of the synchronization phase offset parameters may be manually adjusted by the user or be adjusted by an instruction sent by the control device. When two cameras are provided, the Fm-th frame image herein may be interpreted as an odd-numbered frame image, and the Fn-th frame image may be interpreted as an even-numbered frame image.

Figure 3:
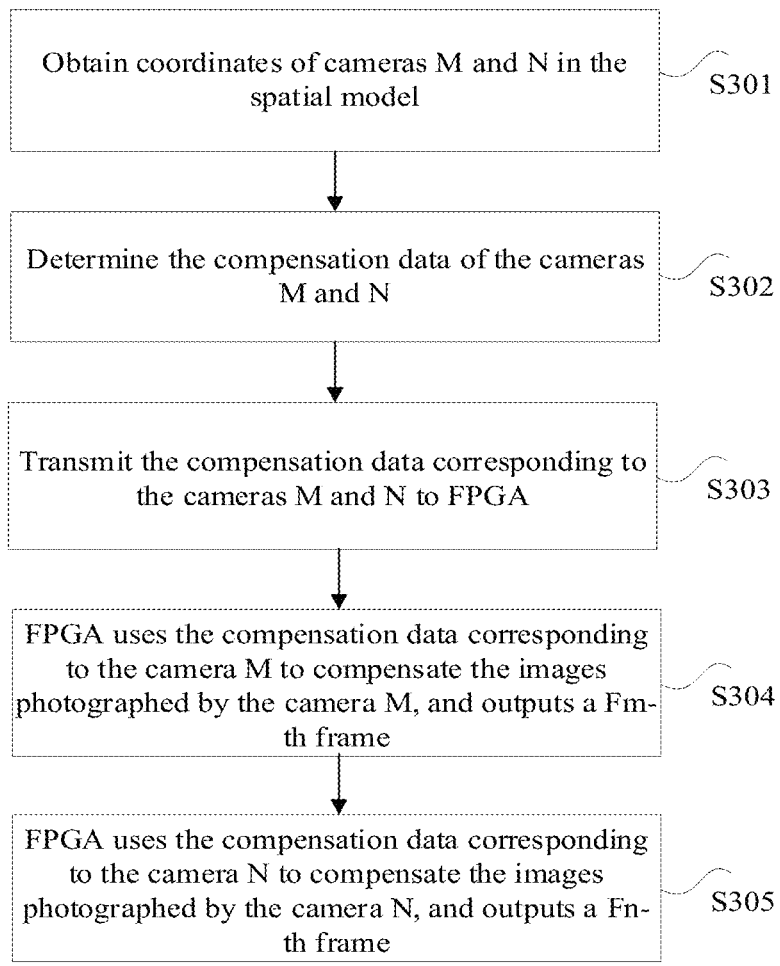
FIG. 3 is a flowchart illustrating a multi-camera cooperation mechanism according to an embodiment of the present invention.

The aforesaid steps may be implemented by using the flowchart shown in FIG. 3. For example, the coordinates of the cameras M and N in the spatial model may be obtained by performing the step S301. For example, the coordinates of the cameras M and N may be obtained through a computing device ARM; at a step S302, the compensation data of the cameras M and N are determined, the process of determination of the compensation data in the step S302 may be implemented by the computing device ARM in the control device; alternatively, the process of determination of the compensation data in the step S302 may be implemented by an independent device (i.e., an ARM device in the coordination processing module); at step S303, the compensation data corresponding to the cameras M and N is sent to a field-programmable gate array (FPGA); at step S304, the FPGA uses the compensation data corresponding to the camera M to compensate the image photographed by the camera M, and outputs the Fm-th frame; at the step S305, the FPGA uses the compensation data corresponding to the camera N to compensate the image photographed by the camera N, and outputs the Fn-th frame.

In the aforesaid process, the implementation process of the target instruction may be implemented by performing the following steps: obtaining identifiers corresponding to the plurality of image acquisition devices, such as cameras 1, camera 2, and camera 3; determining the photographing sequence of the cameras for capturing the frame images according to the identifiers, so that the photographing sequence of the cameras may be determined as 123 or 321, for example, in the event that the photographing sequence is 123, it may be understood that the camera 1 photographs the first image frame, the camera 2 photographs the second image frame, and the camera 3 photographs the third image frame; and the plurality of image acquisition devices are controlled to photograph the frame images displayed on the display screen in sequence according to the target instruction.

In the steps S301-S305, when the positions of the cameras M and N are changed, after the coordinates of the cameras M and N are updated, the aforesaid steps S301-S305 are performed to complete the coordination mechanism among the plurality of image acquisition devices.

It should be noted that the above descriptions are only taken as an illustrative example and are not intended to limit the number of the control devices and the cameras. In an optional embodiment, more than two control devices and more than two cameras may be provided.

In the step S204 of the image processing method of the display screen, compensating the image displayed on the display screen based on the compensation data may include compensating the multiple groups of output frame images based on the compensation data, respectively.

After determining the different frame images photographed by the plurality of image acquisition devices based on the target instruction, the compensation data corresponding to different position information of the plurality of image acquisition devices in the spatial model is determined according to the different position information of the plurality of image acquisition devices in the spatial model, and the different frame images photographed by the plurality of image acquisition devices are compensated based on the compensation data.

For example, taking the control device A and the control device B as an example, in the FPGA logic device of the control device A, output image subframe is compensated. The process may be implemented as follows: an arithmetic unit ARM sends the compensation data to the logic device FPGA. The image processing module of the FPGA may output the frequency-doubled Fm-th frame image and the frequency-doubled Fn-th frame image alternately when the frequency-doubled/frequency interpolated output image is opened. When the Fm-th frame image is sent, the original image data (Red, Green, Blue) corresponding to the Fm-th frame image is obtained, and the compensation data (e.g., Mr, Mg, Mb) corresponding to the Fm-th frame image is invoked, and the compensation data is applied to the output image of the Fm-th frame, and the target image data after compensation of the Fm-th frame is (R*Mr, G*Mg, B*Mb). When the Fn-th frame image is output, assuming that the original image data corresponding to the Fn-th frame image is (Red, Green, Blue), and the compensation data (e.g., Nr, Ng, Nb) corresponding to the Fn-th frame image is invoked. for example, (R, G, G, B), and the target image data after compensation of the Fn-th frame is (R*Nr, G*Ng, B*Nb).

Figure 4:
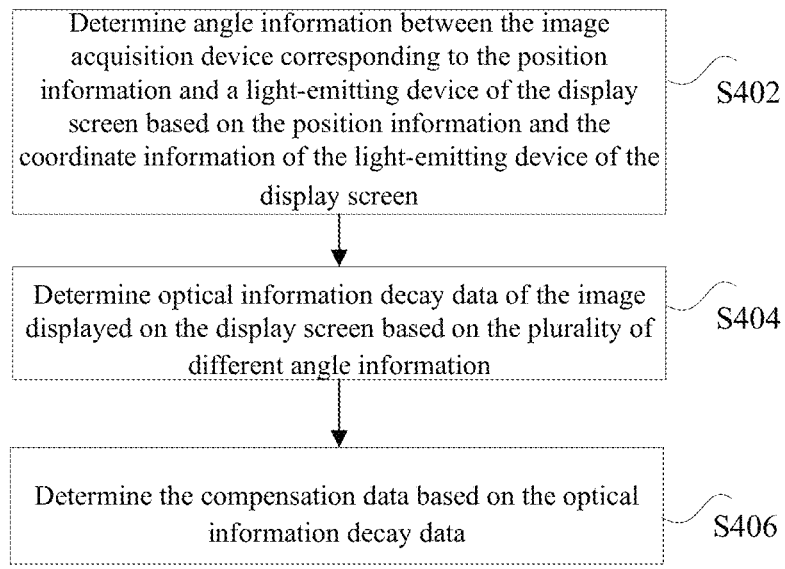
FIG. 4 is a flowchart illustrating a process of obtaining compensation data of the display screen corresponding to position information of an image acquisition device in a spatial model according to an embodiment of the present invention.

In the step S202 of the image processing method of the display screen, said obtaining the compensation data of the display screen corresponding to the position information of the image acquisition device in the spatial model, as shown in the flowchart in FIG. 4, may include the following steps:

In a step of S402, angle information between the image acquisition device corresponding to the position information and a luminescent device of the display screen are determined based on the position information and the coordinate information of the luminescent device of the display screen.

In this embodiment, the function of the coordinate information of the luminescent device is to obtain a connection line between the luminescent device and the position of the image acquisition device to form an included angle with the normal of the display screen, rather than limiting the specific position of the luminescent device. Different compensation data which are generated due to different specific positions of different luminescent devices are not limited in this embodiment.

In this embodiment of the present invention, the coordinate information and the angle information in the step S402 may be implemented through the following steps:

Taking one single LED control device A as an example. According to the arrangement mode of the LED display screen, any fixed point in the space is selected as a first origin O and a first spatial coordinate system P is established. This first spatial coordinate system is an absolute spatial coordinate system, the spatial coordinate system may be a spatial rectangular coordinate system or a spherical coordinate system, or a cylindrical coordinate system. This coordinate system is placed in an arithmetic unit ARM of the control device A, when the compensation data is acquired by an independent device (i.e., the coordination processing module), the coordinate system is placed in the arithmetic unit ARM of the coordination processing module.

Taking a center point of the LED lamp beads, that is, the center point of the luminescent device, as the second origin O', the normal of the center point is the Z' axis, a tangent line of the center point is the X' axis, a tangent line perpendicular to the X' axis is the Y' axis, a second spatial coordinate system P' is established. The second spatial coordinate system is the relative coordinate system. A spherical coordinate of any image acquisition device in the space relative to the center point of the lamp beads is $(r, \theta, \Phi)$, r represents a distance from this point to the center of the lamp beads, $\theta$ represents an elevation angle, and $\Phi$ represents an azimuth angle. An algorithm is used to calculate the compensation data that enables measurement data of the brightness and chrominance of the lamp beads to be consistent when the observation point is under the combination of different $\theta$ and $\Phi$, $\theta$, $\Phi$ and the algorithm for the compensation data are placed in the arithmetic unit ARM of the control device A or in the arithmetic unit ARM of the coordination processing module. For the convenience of illustration, the center point of the lamp bead is abbreviated as lamp bead.

The LED display screen is mapped to the first spatial coordinate system P, and a correspondence relationship between all lamp beads and output images of the control device is established. For example, one certain lamp bead displays an image of an upper left corner point (1, 1) in the output image of the control device, and the coordinate L of the lamp bead in the first spatial coordinate system P is (0.145, 0.258, 0.678). A first coordinate of the center point O' of any lamp bead in the first spatial coordinate system P is (Xd, Yd, Zd), unit normal vector on the Z' axis of a front surface (i.e., a light-emitting surface of the lamp bead) of a specified lamp bead is represented by (Iz, Jz, Kz), unit vector of the X' axis is represented by (Ix, Jx, Kx), unit vector of the Y axis is represented by (Iy, Jy, Ky). The X' axis, the Y' axis, and the Z' axis are the axes of the second spatial coordinate system P'.

The position of the camera is acquired by using a spatial positioning system, and the position of the camera is mapped to the first spatial coordinate system, and it is assumed that the second coordinate of the mapped camera is represented by (Xc, Yc, Zc).

According to the first coordinate and the second coordinate, θ and Φ of the camera relative to each lamp bead may be calculated by using the arithmetic unit ARM arranged in the control device. It should be noted that, when the independent device (i.e., the coordination processing module) is used, θ and Φ of the camera relative to each lamp bead may be calculated by using the arithmetic unit or the arithmetic unit ARM in the coordination processing module. For example, a calculation formula of θ is expressed as:

$$\theta = \arccos\{[Iz*(Xc-Xd) + Jz*(Yc-Yd) + Jz*(Zc-Zd)]/\sqrt{(Xc-Xd)^2 + (Yc-Yd)^2 + (Zc-Zd)^2}\}$$

A plane passing through the O' point and being perpendicular to the Z' axis normal vector is Iz*X+Jz*Y+Kz*Z-Xd*Iz-Yd*Jz-Zd*Kz=0, a projection vector of the line passing through the O' point and the second coordinate (Xc, Yc, Zc) on the plane is expressed as:

$$\{Xc - Xd - Iz*[Iz(Xc-Xd) + Jz(Yc-Yd) + Kz(Zc-Zd)],$$
$$Yc - Yd - Jz*[Iz(Xc-Xd) + Jz(Yc-Yd) + Kz(Zc-Zd)],$$
$$Zc - Zd - Kz*[Iz(Xc-Xd) + Jz(Yc-Yd) + Kz(Zc-Zd)]\},$$
$$\text{let } Xc - Xd - Iz*[Iz(Xc-Xd) + Jz(Yc-Yd) + Kz(Zc-Zd)] = A,$$
$$Yc - Yd - Jz*[Iz(Xc-Xd) + Jz(Yc-Yd) + Kz(Zc-Zd)] = B,$$
$$Zc - Zd - Kz*[Iz(Xc-Xd) + Jz(Yc-Yd) + Kz(Zc-Zd)] = C,$$

an included angle between the projection vector and the X' axis vector is Φ, then, $$\phi = \arccos\left[(Ix*A + Jx*B + Jx*C)/\sqrt{A^2 + B^2 + C^2}\right]$$

According to the aforesaid calculation process of the elevation angle θ and the azimuth angle Φ, the angle information between the image acquisition device corresponding to the position information and the luminescent device of the display screen is obtained.

In a step of S404, optical information decay data of the image displayed on the display screen is determined based on the plurality of different angle information. In this embodiment of the present invention, the optical information decay data is used to indicate that the optical information of the luminescent device of the display screen decays, that is, the decay information includes color decay data which belongs to color information data.

In this embodiment of the present invention, since the optical information decay data corresponding to different angle information is different, the optical information decay data corresponding to the angle information needs to be determined based on the angle information calculated in step S402.

In this embodiment, the different included angles between different position information of the image acquisition device and the coordinate information of the luminescent device of the display screen image may include an included angle that does not generate the optical information decay data vertically and include an included angle that generates the optical information decay data.

In a step of S406, the compensation data is determined based on the optical information decay data, where the compensation data is assigned to a plurality of control devices by any control device.

In this embodiment, the arithmetic unit ARM of the control device is used to calculate the compensation data (Qr, Qg, Qb) required by each lamp bead through the algorithm for the compensation data according to the values of the elevation angle θ and the azimuth angle Φ, and compensate the output image of the control device frame by frame according to the compensation data. The method may include the two approaches listed below: in the first approach, the ARM in the control device sends the compensation data required by the image corresponding to each lamp bead to the logic device FPGA of the control device A; the second approach is that the arithmetic unit ARM in the coordination processing module sends the compensation data required by the image corresponding to each lamp bead to the logic device FPGA of the coordination processing module, and the FPGA in the coordination processing module assigns the compensation data to the FPGA devices of the plurality of control devices. Assuming that a certain lamp bead is located at a position (X, Y) in a plane coordinate system of an output image of the control device, and the compensation data corresponding to the image is (Qr, Qg, Qb), the original image data of a lamp point in the output image of the logic device FPGA is (Red, Green, Blue). After receiving the compensation data sent by the ARM, the FPGA instructs the coordination processing module to apply the compensation data to the image processing module. Then, the target image data after the compensation data is stacked is (R*Qr, G*Qg, B*Qb). It should be noted that, the ARM and the FPGA in the embodiments of the present invention are merely for illustrative purpose, it does not mean that the aforesaid functions can only be implemented through the arithmetic unit ARM and the FPGA.

In the step S406, when the coordination processing module obtains the compensation data, the coordination processing module assigns the compensation data to the plurality of control devices. In this embodiment of the present invention, the control device may be a controller.

Figure 5:
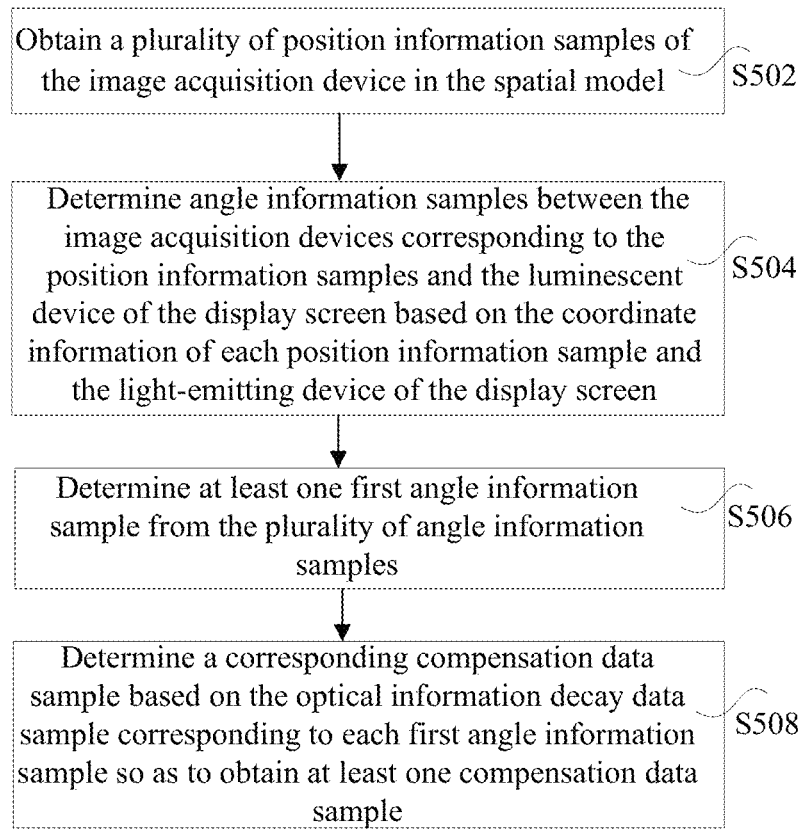
FIG. 5 is a flowchart illustrating a process of determining the compensation data based on optical information decay data according to an embodiment of the present invention.

In the step S406 in the image processing method of the display screen, said determining the compensation data based on the optical information decay data may be implemented through the flowchart shown in FIG. 5, and may further include the following steps:

At a step S502, a plurality of position information samples of the image acquisition device in the spatial model is obtained, where the plurality of position information samples include position information.

At a step S504, angle information samples between the image acquisition devices corresponding to the position information samples and the luminescent device of the display screen are determined based on the coordinate information of each position information sample and the luminescent device of the display screen, so that a plurality of angle information samples are obtained.

At a step S506, at least one first angle information sample is determined from the plurality of angle information samples, where the at least one first angle information sample includes angle information and is configured to cause an image displayed on the display screen to generate an optical information decay data sample.

At a step S508, a corresponding compensation data sample is determined based on the optical information decay data sample corresponding to each first angle information sample to obtain at least one compensation data sample, where the at least one compensation data sample includes compensation data.

In this embodiment, in the steps S502-S508, an optical measurement device is used to simulate brightness and chrominance information of each luminescent device of the display screen photographed by the image acquisition device, that is, the process of acquisition of the optical information decay data sample is obtained. In this process, different position information of the optical measurement device in the spatial model constitutes a plurality of position information samples. Under different position information samples, the angle information sample between the image acquisition device corresponding to the current coordinate information sample and each luminescent device may be determined through the calculation process in the step S402, according to the coordinate information of each luminescent device of the display screen in the spatial model. When the optical measurement device is located at different positions, a plurality of angle information samples are obtained.

It should be noted that when the optical measurement device is located at different positions, the angle information corresponding to the optical measurement device may or may not generate optical information decay data. In this embodiment of the present invention, the angle information sample that generates the optical information decay data is determined as the first angle information sample, and the optical information decay data corresponding to the first angle information sample is optical information decay data sample.

In the step S508, said determining the compensation data based on the optical information decay data may include querying the compensation data corresponding to the optical information decay data in at least one compensation data sample.

According to the first angle information sample and the optical information decay data, the compensation data sample corresponding to the optical information decay data is determined through an algorithm under the current angle information, a correspondence relationship between the angle information, the optical information decay data and the compensation data may be obtained. The correspondence relationship is stored in the first database for subsequent querying. Where, the first database may be a compensation coefficient lookup table, a coefficient collection program, and the like.

In the aforesaid image processing method of the display screen, the method further includes determining, based on the position information, whether the image displayed on the display screen needs to be compensated.

In one embodiment, determining whether the image displayed by the display screen needs to be compensated includes two conditions below: in the first condition, when determining that the first image in the image displayed on the display screen generates the optical information decay data based on the position information, it is determined that the first image needs to be compensated; in the second condition, when determining that the second image in the image displayed on the display screen does not generate the optical information decay data based on the position information, it is determined that the second image does not need to be compensated, the calculation amount generated when the compensation data is calculated is reduced accordingly.

The angles of the images displayed by photographing the display screen is also different when the image acquisition device is located at different positions of in the spatial model, the optical information decay data may be generated at different photographing angles. Alternatively, the optical information decay data may not be generated. In the event that the optical information decay data is generated, the corresponding image is the first image, and the first image needs to be compensated using the compensation data, such that the image does not have a color cast problem when the image displayed on the display screen is photographed by the image acquisition device. In the event that the optical information decay data is not generated, the corresponding image is the second image, and the second image does not need to be compensated.

Optionally, pixel points of all images displayed on the display screen may be compensated using the compensation data. Regarding a pixel of the image that does not need to be compensated actually, the value of the compensation data may be 1.

In the aforesaid image processing method of the display screen, said obtaining the compensation data of the display screen corresponding to the position information may include the following steps: determining the first image based on the coordinate information of the image acquisition device in the spatial model, and the angle information between the image acquisition device and the luminescent device of the display screen, where the position information includes the coordinate information and the angle information; and retrieving the compensation data corresponding to the first image from the first database, where the first database includes the coordinate information, the angle information, the compensation data, and a correspondence relationship between the coordinate information, the angle information, and the compensation data.

In this embodiment, after the coordinate information of the image acquisition device in the spatial model is obtained, the angle information between the image acquisition device and the luminescent device is obtained through the calculation process in step S402 according to the coordinate information of the luminescent device in the spatial model. The compensation data required by the image displayed on the display screen at the current photographing angle may be determined by retrieving the corresponding relationship between the angle information, the position information and the compensation data in the first database.

In the image processing method of the display screen, the first database includes a plurality of compensation data samples corresponds to a plurality of position information samples of the image acquisition device in the spatial model in one-to-one correspondence manner. The compensation data samples are obtained based on the optical information decay data samples generated in the images photographed by the corresponding image acquisition device, the plurality of position information samples include position information, and the plurality of compensation data samples include compensation data.

In the image processing method of the display screen, the first image to be compensated by the display screen is obtained by the coordination processing module from a receiving device of the display screen, the target control device for controlling displaying of the first image in the plurality of control devices is determined by the coordination processing module, and the target control device is controlled by the coordination processing module so as to compensate the luminescent device corresponding to the first image based on the compensation data.

In the aforesaid process, when the control device determines the compensation data required by the image displayed on the display screen, the control device which is used for controlling the images obtains the first image and compensates the luminescent device corresponding to the first image based on the compensation data. In another optional embodiment, when the compensation data required for the image displayed on the display screen is determined by the coordination processing module, the coordination processing module obtains the first image that needs to be compensated and determines the target control device for controlling the displaying of the first image and compensates the luminescent device corresponding to the first image based on the compensation data.

In this embodiment, the coordination processing module may have one more function, this function may be used to determine how many luminescent devices decay, and a decay range may be provided, and the coordination processing module accurately controls a corresponding controller and a receiving card to perform compensation. Optionally, the coordination processing module in this embodiment has a relatively strong computing capability that may be higher than the computing capability of the control device. Moreover, a dedicated function for precisely sending the compensation data to the control device is provided, and the synchronizing signal configured for synchronizing the image acquisition device and the control device may be generated simultaneously.

In the image processing method of the display screen, determining whether the image displayed on the display screen need to be compensated based on the position information may include the following steps: obtaining the first image and the second image sent from the coordination processing module, where the first image is an image that needs to be compensated in the image displayed on the display screen, the second image is an image that does not need to be compensated in the image displayed on the display screen, the first image and the second image are determined by the coordination processing module based on the second database. The second database includes the image of the display screen which needs to be compensated and is determined by the position information and/or the image of the display screen which does not need to be compensated and is determined by the position information.

In the aforesaid step, when the coordination processing module determines whether the image displayed on the display screen needs to be compensated based on the position information, after the coordination processing module obtains the first image that needs to be compensated and the second image that does not need to be compensated, the coordination processing module may determine the compensation data corresponding to the first image from the first database based on the position information and the angle information of the first image, and compensates the first image based on the compensation data. The first database may be a compensation coefficient lookup table.

Optionally, in this embodiment, an optical collection device or an optical measurement device (e.g., a light gun) may be used to obtain the angle information between the image acquisition device and the luminescent device of the display screen through different calibration points, obtain the optical information decay data under different angle information, obtain a second database based on the optical information decay data through an interpolation algorithm. Where, the second database may include optical information decay data of lamp points under all angles. Optionally, the second database may include information regarding which luminescent device does not generate optical information decay.

In the image processing method of the display screen, the position information includes the coordinate information of the image acquisition device in the spatial model and the angle information between the image acquisition device and the luminescent device in the spatial model. Obtaining the angle information of the image acquisition device relative to each luminescent device in the spatial model may include the following steps: obtaining first coordinate information of the image acquisition device in the spatial model, and obtaining second coordinate information of each luminescent device in the spatial model; determining the angle information of the image acquisition device relative to each luminescent device at least based on the first coordinate information and the second coordinate information. Where, the angle information includes an elevation angle of the image acquisition device relative to each luminescent device and an azimuth angle of the image acquisition device relative to each luminescent device.

The aforesaid obtaining the angle information of the image acquisition device relative to each luminescent device in the spatial model is consistent with the calculation process in the step S402 and is not repeatedly described herein.

In the image processing method of the display screen, the spatial model is established by taking a target position in a space where the display screen is located as a coordinate origin. Where, the target position includes points on an edge of the display screen. In this embodiment of the present invention, the spatial model may be the first spatial coordinate system in the step S402.

The aforesaid image processing method of the display screen has the following beneficial effects, including: first, the spatial positioning system of the camera in a XR virtual photographing scene is fully utilized; second, as compared to brightness compensation through the LED display screen (i.e., the receiving device), this technical solution has the advantages of fast response speed, and strong instantaneity, and the like, and can solve a problem of frequent use of the compensation data caused due to frequent movement of the camera; three, real-time brightness compensation can be performed on the display screen driven by the plurality of cameras and the plurality of control devices, such that the display screen does not have color cast problem.

Figure 6A:
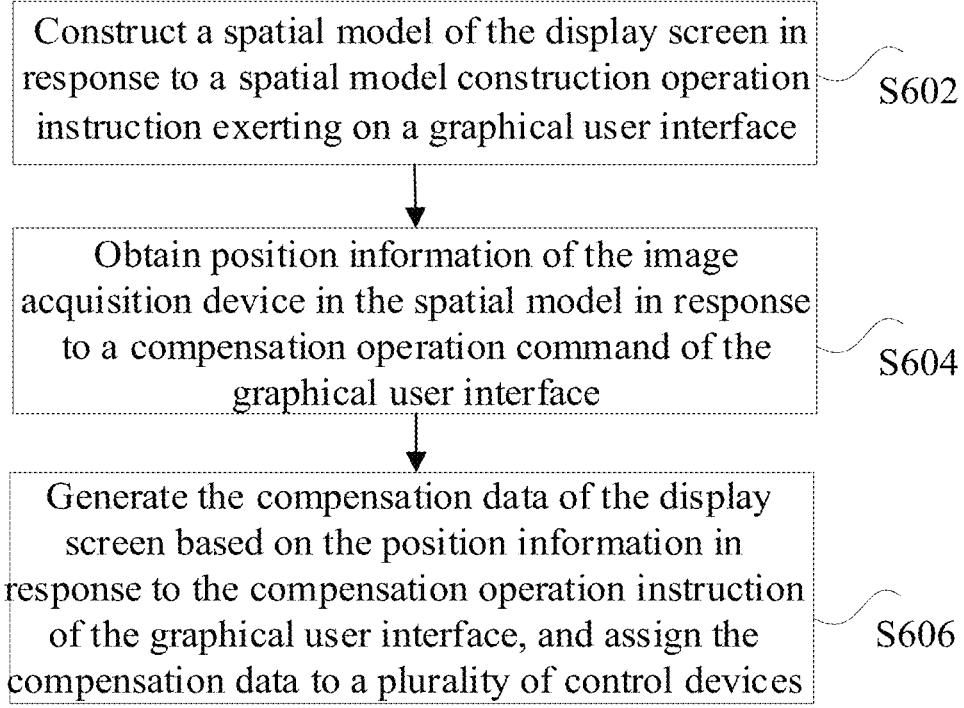
FIG. 6A is a flowchart of another image processing method of the display screen according to an embodiment of the present invention.

FIG. 6A is a flowchart of another image processing method of the display screen according to an embodiment of the present invention. As shown in FIG. 6A, this method includes:

in a step of S602, a spatial model of the display screen is constructed in response to a spatial model construction operation instruction exerting on a graphical user interface. Where, the spatial model is used to represent a three-dimensional coordinate system where the display screen is located.

In the step S602, construction of the spatial model for the display screen may be input through an operation of the user. Optionally, the user may input a shape of the current display screen into a software for performing the method shown in FIG. 6 according to the shape of the current display screen, the software may construct the spatial model according to the input shape of the display screen.

In a step of S604, position information of the image acquisition device in the spatial model is obtained, where the image acquisition device is configured to photograph an image displayed on the display screen.

In the aforesaid step S604, the position information of the image acquisition device in the spatial model may be selected by the user manually according to the shape of the current display screen, that is, the position information may be obtained manually. In another optional embodiment, the position information of the image acquisition device in the spatial model may be obtained by automatically loading software.

In a step of S606, the compensation data of the display screen is generated based on the position information in response to a compensation operation instruction from the graphical user interface, and the compensation data is assigned to the plurality of control devices. Where, the plurality of control devices are configured for loading the display screen. After receiving the corresponding compensation data, the plurality of control devices adjust the images displayed on the LED display screen pixel-by-pixel according to the compensation data.

Another image processing method of the display screen shown in FIG. 6A may be a software executing in a computer, and the image processing method of the display screen in the steps S602-S606 is implemented through the software. It should be noted that the relevant explanations and descriptions in the image processing method of the display screen shown in FIG. 6A are consistent with the methods described in the FIGS. 2-5 and are not repeatedly described herein.

Figure 6B:
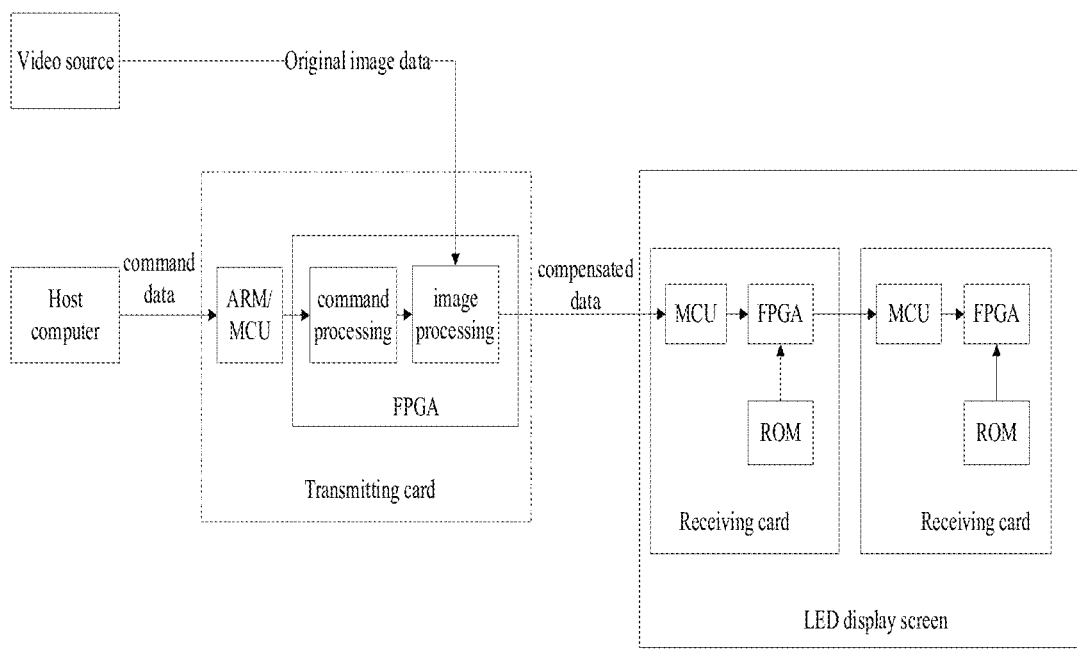
FIG. 6B is a schematic diagram of a software-based image processing method of the display screen according to an embodiment of the present invention.

FIG. 6B is a schematic diagram of an image processing method of a display screen based on software according to an embodiment of the present invention. As shown in FIG. 6B, the video source may be the image acquisition device, that is, the image acquisition device may be a camera, a video camera or other device that is configured to photograph original image data. A host computer may be a computer installed with the image processing method of the display screen shown in FIG. 6A. After the host computer has performed the steps S602-S606, the host computer assigns the generated compensation data to the arithmetic unit ARM/microcontroller unit (MCU) of the control devices in the form of command data. In this embodiment, the control device may be the transmitting card shown in FIG. 6B, however, the control device is not limited thereto. In another optional embodiment, the control device may also be other video processing device having a transmission function, such as a video two-in-one processing device, the ARM/MCU forwards the compensation data to a FPGA in the transmitting card, after parsing the command data sent by the host computer, a command processing module in the FPGA transmits the compensation data to an image processing module, the image processing module compensates the original image data based on the compensation data and the original image data, and sends the compensated image data to a receiving card corresponding to the LED display screen.

Figure 7:
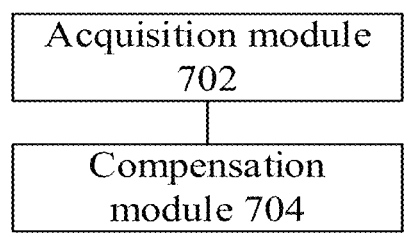
FIG. 7 is a structural diagram of an image processing apparatus of a display screen according to an embodiment of the present invention.

FIG. 7 is a structural diagram of an image processing apparatus of a display screen according to an embodiment of the present invention. As shown in FIG. 7, the apparatus may be applied to any control device in a plurality of control devices, and includes:

an acquisition module 702 configured to obtain compensation data of the display screen corresponding to position information of an image acquisition device in a spatial model, where the image acquisition device is configured to photograph an image displayed on the display screen, the spatial model is used to represent a three-dimensional coordinate system where the display screen is located, and the control device and the image acquisition device are controlled to be synchronized by a synchronizing signal;

a compensation module 704 configured to compensate the image displayed on the display screen based on the compensation data.

The image processing apparatus of the display screen shown in FIG. 7 may be configured to perform the image processing method of the display screen shown in FIG. 2. Thus, the related explanations and descriptions in the image processing method of the display screen are also applicable to the image processing apparatus of the display screen and are not repeatedly described herein.

Figure 8A:
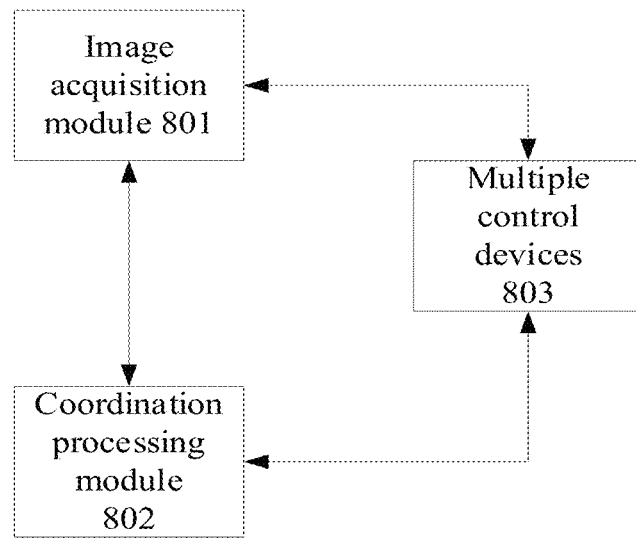
FIG. 8A is a structural diagram of an image processing system of a display screen according to an embodiment of the present invention.

FIG. 8A is a structural diagram of an image processing system of a display screen according to an embodiment of the present invention. As shown in FIG. 8A, this system includes at least one image acquisition device 801, a coordination processing module 802, and a plurality of control devices 803. Where, the image acquisition device 801 is configured to photograph an image displayed on the display screen, where the control device and the image acquisition device are controlled to be synchronized by a synchronizing signal received from the control device. The coordination processing module 802 is configured to: obtain a spatial model of the display screen, where the spatial model is used to represent a three-dimensional coordinate system where the display screen is located; obtain position information of the image acquisition device in the spatial model, where the image acquisition device is configured to photograph the image displayed on the display screen; generate compensation data of the display screen based on the position information; synchronize the compensation data to a plurality of control devices; the plurality of control devices 803 configured to compensate the image based on the compensation data, where the plurality of control devices are configured for loading the display screen.

It should be noted that the image processing system of the display screen shown in FIG. 8A is configured to perform the image processing method of the display screen shown in FIGS. 2-5. Thus, the related explanations and descriptions in the image processing method of the display screen are also applicable to the image processing system of the display screen and are not repeatedly described herein.

Figure 8B:
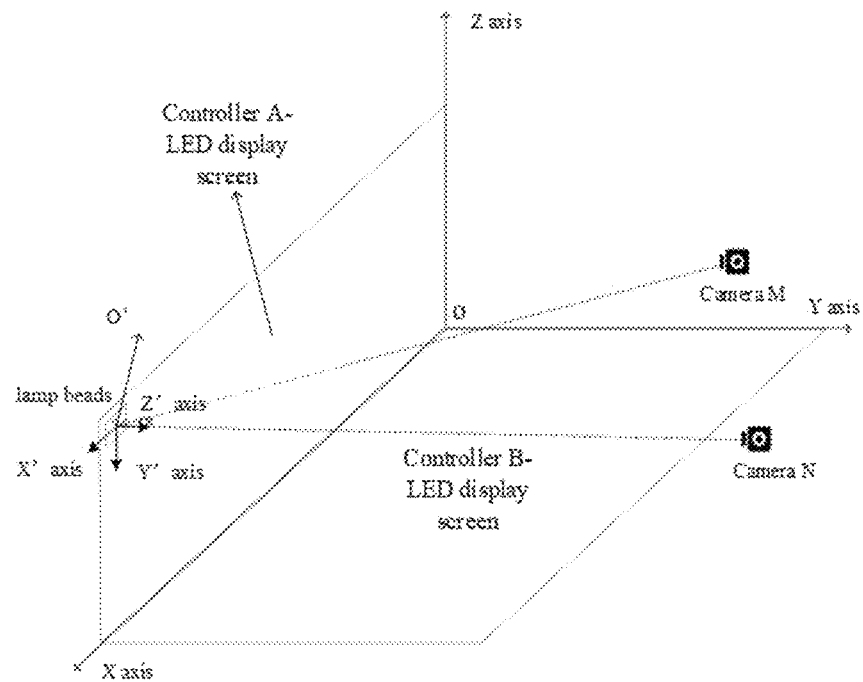
FIG. 8B is a schematic diagram based on a plurality of image acquisition devices and a plurality of control devices according to an embodiment of the present invention.

FIG. 8B is a schematic diagram based on a plurality of image acquisition devices and a plurality of control devices according to an embodiment of the present invention. in FIG. 8B, the control device A and the control device B control two display screens in the figure respectively, and two cameras M and N are provided. By performing the method in the step S402, an elevation angle $\theta$ m and an azimuth angle $\Phi$ n of the camera M relative to each lamp bead may be determined respectively, and an elevation angle $\theta$ m and an azimuth angle $\Phi$ n of the camera N relative to each lamp bead may be determined.

Figure 8C:
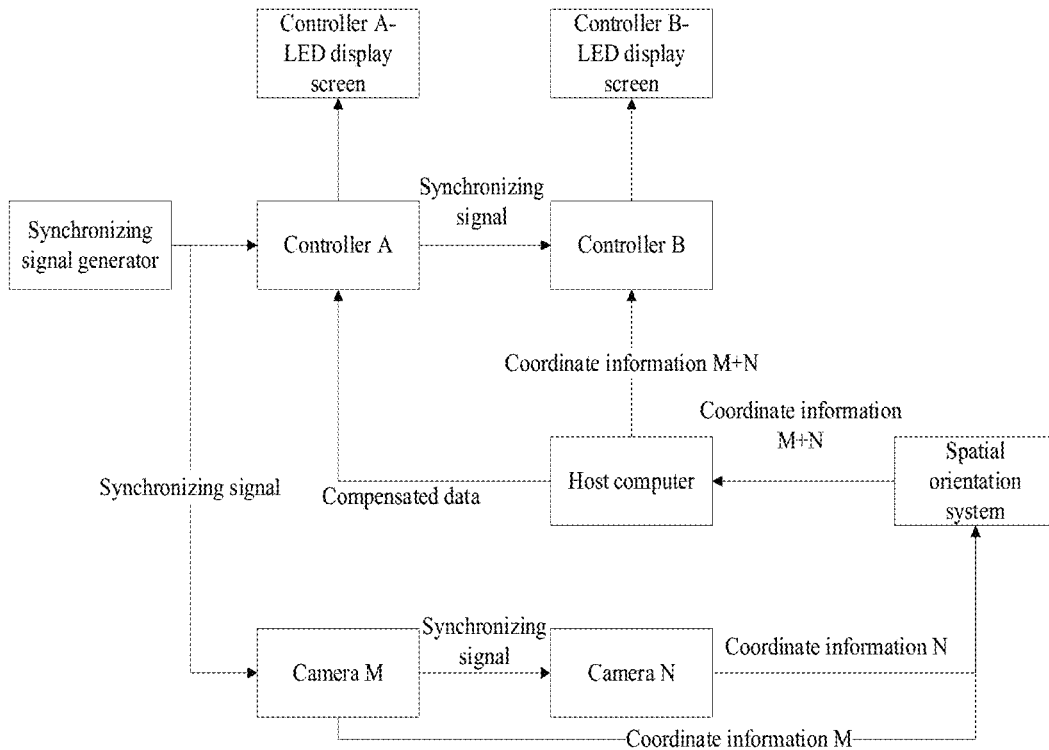
FIG. 8C is a diagram of a system architecture based on a plurality of image acquisition devices and a plurality of control devices according to an embodiment of the present invention.

FIG. 8C is a diagram of a system architecture based on a plurality of image acquisition devices and a plurality of control devices according to an embodiment of the present invention. In the FIG. 8C, the two control devices A and B and the cameras M and N are taken as an example. The control device A is used to control a control device A-LED display screen in FIG. 8B, the control device B is configured to control a control device B-LED display screen in FIG. 8B, each control device and each camera are connected to the same synchronizing signal system through a synchronizing signal sent by a synchronizing signal generator, the synchronizing signal is at least used for synchronizing the coordinate information of the cameras M and N in the spatial model, the coordinate information M of the camera M and the coordinate information N of the camera N are acquired through the spatial positioning system, and the coordinate information of M and N is simultaneously mapped to the spatial coordinate system of the arithmetic units ARM of the control devices A and B through the host computer. Assuming that the coordinates of the cameras after mapping are (Xm, Ym, Zm) and (Xn, Yn, Zn), respectively.

The arithmetic unit ARM of the control device A is used to calculate compensation values (Mr, Mg, Mb) and (Nr, Ng, Nb) required by each lamp bead relative to the cameras M and N according to the elevation angle θ m and the azimuth angle Φ n of the camera M in FIG. 8B with respect to each lamp bead, and the elevation angle θ m and the azimuth angle Φ n of the camera N with respect to each lamp bead. The same applies to the control device B.

The output image subframe is compensated in the logic device FPGA of the control device A. The process may be as follows: the arithmetic unit ARM sends the compensation data to the logic device FPGA. The image processing module of the FPGA may alternately output the frequency-doubled Fm-th frame and the Fn-th frame image when the frequency-doubled/interpolated frame output image is opened. When the Fm-th frame image is transmitted, the original image data (Red, Green, Blue) corresponding to the Fm-th frame image is obtained, the compensation data (e.g., Mr, Mg, Mb) corresponding to the Fm-th frame image is invoked and the compensation data is applied to the output image of the Fm-th frame. Then, the target image data after compensating the Fm-th frame is (R*Mr, G*Mg, B*Mb). When the Fn-th frame image is output, assuming that the original image data corresponding to the Fn-th frame image is (Red, Green, Blue), the compensation data (e.g., Nr, Ng, Nb) corresponding to the Fn-th frame image is invoked. Then, the target image data after compensating the Fn-th frame is (R*Nr, G*Ng, B*Nb). The same applies to the control device B.

Figure 9A:
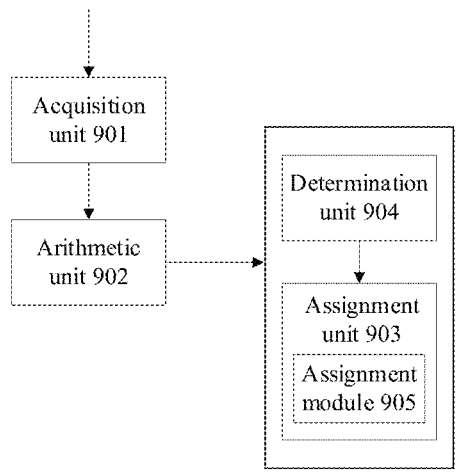
FIG. 9A is a structural diagram of an image processing device of a display screen according to an embodiment of the present invention.

FIG. 9A is a structural diagram of an image processing device of a display screen according to an embodiment of the present invention. As shown in FIG. 9, this device includes: an acquisition unit 901, an arithmetic unit 902, and an assignment unit 903. Where, the acquisition unit 901 is configured to obtain position information of the image acquisition device in a spatial model of the display screen, where the spatial model is used to represent a three-dimensional coordinate system where the display screen is located. The arithmetic unit 902 is configured to generate compensation data of the display screen based on the position information. The assignment unit 903 is configured to assign the compensation data to a plurality of control devices, where the plurality of control devices are configured for loading the display screen.

The image processing device of the display screen shown in FIG. 9A may be the coordination processing device for implementing the functions of the coordination processing module. In the image processing device shown in FIG. 9A, this device may obtain the position information of the image acquisition device by utilizing a bidirectional communication interface or obtain the position information of the image acquisition device in a wireless transmission manner, and this device has a power function.

The image processing device of the display screen further includes a determination unit 904 configured to determine a receiving device and a driving module of a luminescent device corresponding to an image of the display screen to be compensated. The assignment unit 903 includes: an assignment module 905 configured to send compensation data to control devices corresponding to the receiving device (e.g., the receiving card) and the driving module (e.g., a driving IC, a driving chip, etc.).

In this embodiment, the image of the display screen to be compensated may be obtained, the compensation image corresponds to a luminescent device in the display screen, the determination unit determines a corresponding receiving card and a corresponding driving chip. The assignment module sends accurate compensation data to the controllers relating to the receiving cards and the driving chip.

Figure 9B:
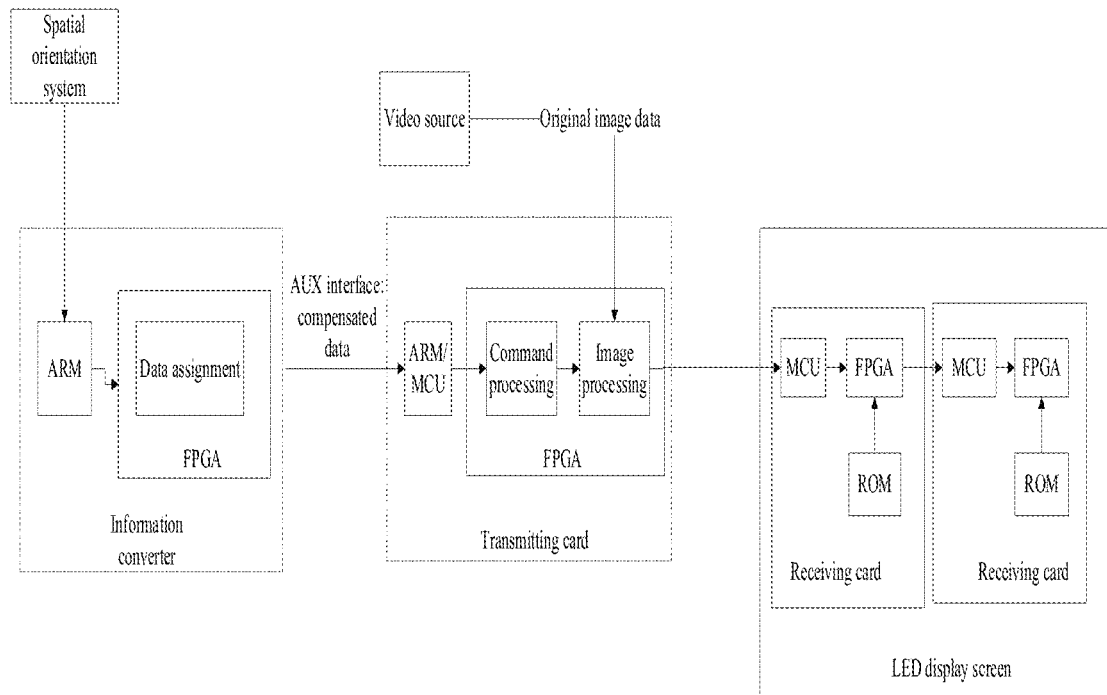
FIG. 9B is a data flowchart based on an information converter according to an embodiment of the present invention.

The image processing device shown in FIG. 9A may also be the information converter in FIG. 9B or be a device having the same function as the coordination processing module, and this device may be a dedicated device in a scene photographing scenario in which the LED display screen is controlled by a plurality of control devices. This device may also be a host computer software, a server, or be implemented by a transmission device and a multi-in-one device in a compatible manner, the compensation data is generated through this device. As shown in FIG. 9B, after obtaining the position information of the image acquisition device in the spatial model by the spatial positioning system in FIG. 9B, the spatial positioning system sends the position information to the ARM in the information converter, the ARM generates the compensation data based on the position information and sends the compensation data to the FPGA in the information converter which realizes forwarding of the compensation data. In FIG. 9b, the information converter transmits the compensation data to the ARM/MCU in the transmitting card through an AUX interface, the ARM/MCU forwards the compensation data to the FPGA in the transmitting card. A command processing module in the FPGA parses the compensation data and transmits the compensation data to the image processing module. The image processing module compensates the original image data based on the compensation data and the original image data and sends the compensated image data to the corresponding receiving card of the LED display screen.

Figure 9C:
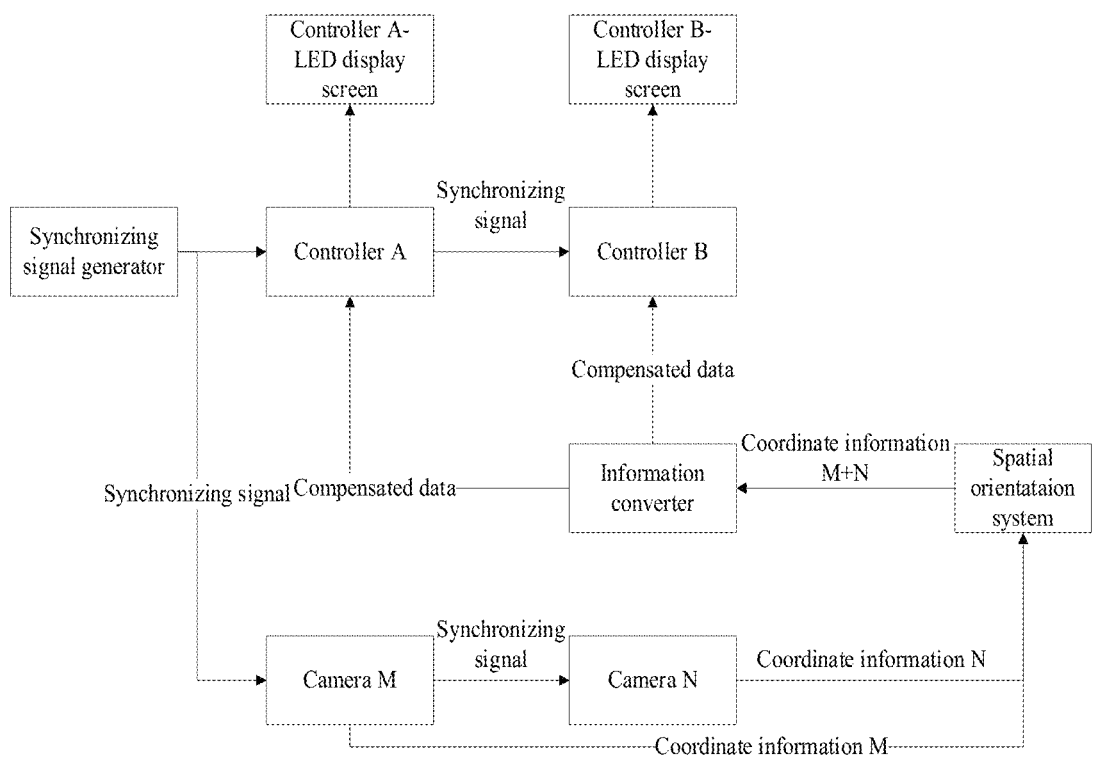
FIG. 9C is a diagram of a system architecture based on the information converter according to an embodiment of the present invention.

FIG. 9C is a diagram of a system architecture based on the information converter according to an embodiment of the present invention. As shown in FIG. 9C, taking two control devices A and B, and cameras M and N as an example, the spatial positioning system is configured to obtain coordinate information M of the camera M in the spatial model, obtain coordinate information N of the camera N in the spatial model, and synchronize the coordinate information M and the coordinate information N to the cameras and the control devices through a synchronizing signal generator. After obtaining the coordinate information M and N from the spatial positioning system, the information converter generates the compensation data, and sends the generated compensation data to the control devices, in order that the control devices compensate the original image data based on the compensation data.

A non-transitory computer readable storage medium is further provided in one embodiment of the present invention. The non-transitory computer readable storage medium includes a stored program, when the program is executed, a device of the non-transitory computer readable storage medium is controlled to perform the following image processing method of the display screen: obtaining compensation data of the display screen corresponding to position information of an image acquisition device in the spatial model, where the image acquisition device is configured to photograph an image displayed on the display screen, the spatial model is used to represent a three-dimensional coordinate system where the display screen is located, and the control device and the image acquisition device are controlled to be synchronized by a synchronizing signal; and compensating the image displayed on the display screen based on the compensation data.

The sequence of the embodiments is merely illustrative and does not represent advantages and disadvantages of the embodiments.

In the embodiments of the present invention, the descriptions of the embodiments in the present invention are emphasized respectively, regarding the part in some embodiments which is not described in detail, reference may be made to related descriptions in other embodiments.

It should be understood that, in the embodiments of the present invention, the disclosed technical contents could be implemented in other ways. For example, the device embodiments described above are merely illustrative. For example, the division of the units is only a logical function division, and other division could be used in the actual implementation. For example, multiple units or components could be combined or integrated into another system, or some features may be ignored, or not performed. In another aspect, the coupling or direct coupling or communicating connection shown or discussed could be an indirect coupling or a communicating connection through some interfaces, devices or units, and the coupling or direct coupling or communicating connection could be electrical, mechanical, or in other form.

The units described as separate components can be or cannot be physically separate, the components shown as units can be or cannot be physical units, the components may be located in one place, or be distributed onto multiple network elements. A part or a whole of the elements can be selected to achieve the objective of the technical solution of this embodiment according to the actual requirement.

In addition, the various functional units in each of the embodiments of the present invention may be integrated into a single processing unit, or exist individually and physically, or two or more than two units are integrated into a single unit. The aforesaid integrated unit can either be achieved by hardware, or be achieved in the form of software functional units.

If the functionalities are achieved in the form of software functional units, and are sold or used as an independent product, they may be stored in a computer readable storage medium. Based on this understanding, the technical solution of the present invention, or the part that is contributable to related art, or some or all of the technical solution may be embodied in the form of software product essentially. The computer softer product is stored in a storage medium and includes an instruction that enables a computer device (which may be a personal computer, a server, or a network device, and the like) to execute all or part of steps of methods in the various embodiments of the present invention. The aforesaid storage medium includes various mediums capable of storing program codes such as USB flash disk, ROM (Read-Only Memory), RAM (Random Access Memory), mobile hard disk, hard disk, optical disk, and the like.

The foregoing only describes preferable embodiments of the present invention. It should be noted that, for a person of ordinary technical skill in this field, some improvements and modifications may be made without departing from the principle of the present invention. These improvements and modifications should also be regarded as being included in the scope of protection of the present invention.

What is claimed is:

1. An image processing method of a display screen being applied to any control device in a plurality of control devices, the plurality of control devices are configured for loading the display screen, the method comprising:

obtaining compensation data of the display screen corresponding to position information of at least one image acquisition device in a spatial model, wherein the image acquisition device is configured to photograph an image displayed on the display screen, the spatial model is used to represent a three-dimensional coordinate system where the display screen is located, and the control device and the image acquisition device are controlled to be synchronized by a synchronizing signal; and compensating the image displayed on the display screen based on the compensation data-;

wherein said obtaining the compensation data of the display screen corresponding to the position information of the image acquisition device in the spatial model comprises:

receiving the compensation data sent from a coordination processing module, wherein the coordination processing module is connected to at least one control device of the plurality of control devices, the compensation data is generated by the coordination processing module based on the obtained position information, and the position information is determined by the coordination processing module based on the obtained spatial model and the position information of the image acquisition device;

wherein the position information is obtained by the coordination processing module or by the control device according to a target frequency; and/or the compensation data is obtained by the coordination processing module or by the control device, if an amount of variation in the position information meets a target threshold value.

2. The method according to claim 1, wherein the coordination processing module communicates with the image acquisition device based on wireless transmission.

3. The method according to claim 1, wherein the compensation data is sent back to a server by the coordination processing module, wherein said compensating the image displayed on the display screen based on the compensation data comprises:

obtaining, from the server, a compensation result obtained by compensating the image displayed on the display screen based on the compensation data.

4. The method according to claim 1, wherein a plurality of image acquisition devices are provided, said obtaining the compensation data of the display screen corresponding to the position information of the at least one image acquisition device in the spatial model comprises:

outputting multiple groups of frame images alternately and obtaining the compensation data corresponding to the multiple groups of the output frame images, wherein the compensation data is generated based on the position information of the corresponding image acquisition device in the spatial model.

5. The method according to claim 1, wherein a plurality of image acquisition devices are provided, said obtaining the compensation data of the display screen corresponding to the position information of the image acquisition device in the spatial model comprises:

obtaining multiple groups of frame images based on a target instruction, wherein each of the multiple groups of the frame images corresponds to one control device, and the target instruction is used for adjusting a frequency used by each image acquisition device when photographing the image displayed on the display screen; and obtaining the compensation data corresponding to the multiple groups of output frame images when alternately outputting the multiple groups of frame images, wherein the compensation data is generated based on the position information of the corresponding image acquisition device in the spatial model.

6. The method according to claim 5, wherein said compensating the image displayed on the display screen based on the compensation data comprises:
compensating the multiple groups of output frame images based on the compensation data, respectively;
said obtaining the compensation data of the display screen corresponding to the position information of the image acquisition device in the spatial model comprises:
determining, based on the position information and coordinate information of a luminescent device of the display screen, multiple different angle information between the plurality of image acquisition devices corresponding to the position information and the luminescent device of the display screen; determining optical information decay data of the image displayed on the display screen based on the multiple different angle information; and determining the compensation data based on the optical information decay data, wherein the compensation data is assigned by any control device to another control device excluding the control device in the plurality of control devices.

7. The method according to claim 6, further comprising:
obtaining a plurality of position information samples of the image acquisition device in the spatial model, wherein the plurality of position information samples comprise the position information;
determining, based on the plurality of position information samples and the coordinate information of the luminescent device of the display screen, a plurality of angle information samples between the plurality of image acquisition devices corresponding to the plurality of position information samples and the luminescent device of the display screen, to obtain the plurality of angle information samples;
determining at least one first angle information sample from the plurality of angle information samples, wherein the at least one first angle information sample comprises the angle information and is configured to cause the image displayed on the display screen to generate an optical information decay data sample; and
determining a corresponding compensation data sample based on the optical information decay data sample corresponding to each first angle information sample to obtain at least one compensation data sample, wherein the at least one compensation data sample comprises the compensation data;
wherein said determining the compensation data based on the optical information decay data comprises: querying the compensation data corresponding to the optical information decay data in the at least one compensation data sample.

8. The method according to claim 1, further comprising:
determining, if it is determined that a first image in the image displayed on the display screen generates optical information decay data based on the position information, that the first image needs to be compensated; or
determining, if it is determined that a second image in the image displayed on the display screen does not generate the optical information decay data based on the position information, that the second image does not need to be compensated.

9. The method according to claim 8, wherein said obtaining the compensation data of the display screen corresponding to the position information comprises:
determining the first image based on coordinate information of the image acquisition device in the spatial model, and angle information between the image acquisition device and a luminescent device of the display screen, wherein the position information comprises the coordinate information and the angle information; and
retrieving the compensation data corresponding to the first image from a first database, wherein the first database comprises the coordinate information, the angle information, the compensation data, and a correspondence relationship between the coordinate information, the angle information and the compensation data.

10. The method according to claim 9, wherein the first database comprises a plurality of compensation data samples, and the plurality of compensation data samples correspond to a plurality of position information samples of the image acquisition device in the spatial model in a one-to-one correspondence manner, the plurality of compensation data samples are obtained based on optical information decay data samples generated in the image photographed by the corresponding image acquisition device, the plurality of position information samples comprise the position information, and the plurality of compensation data samples comprise the compensation data.

11. The method according to claim 8, wherein the first image of the display screen that needs to be compensated is obtained by a coordination processing module from a receiving device of the display screen, a target control device configured for controlling displaying of the first image in the plurality of control devices is determined by the coordination processing module, and the target control device is controlled by the coordination processing module to compensate a luminescent device corresponding to the first image based on the compensation data.

12. The method according to claim 1, further comprising:
obtaining a first image and a second image sent by a coordination processing module, wherein the first image is an image that needs to be compensated in the image displayed on the display screen, the second image is an image that does not need to be compensated in the image displayed on the display screen, the first image and the second image are determined by the coordination processing module based on a second database, the second database comprises an image of the display screen that needs to be compensated and is determined by the position information and/or an image of the display screen that does not need to be compensated and is determined by the position information.

13. The method according to claim 1, wherein the position information comprises coordinate information of the image acquisition device in the spatial model and angle information of the image acquisition device and a plurality of luminescent devices of the display screen in the spatial model, obtaining the angle information of the image acquisition device relative to each of the luminescent devices in the spatial model comprises:
obtaining first coordinate information of the image acquisition device in the spatial model, and obtaining second coordinate information of each of the plurality of luminescent devices in the spatial model; and
determining the angle information of the image acquisition device relative to each of the plurality of luminescent devices at least based on the first coordinate information and the second coordinate information, wherein the angle information comprises an elevation angle of the image acquisition device relative to each of the plurality of luminescent devices and an azimuth angle of the image acquisition device relative to each of the plurality of luminescent devices.

14. The method according to claim 1, wherein the spatial model is established by taking a target position in a space where the display screen is located as a coordinate origin, and the target position comprises a point on an edge of the display screen.

15. A non-transitory computer readable storage medium, wherein the computer readable storage medium stores a computer program, that, when executed by an image processing device of a display screen, causes the image processing device to perform the image processing method of the display screen according to claim 1.

* * * * *